3,361,760
BENZOTHIAZEPINES
John Krapcho, Somerset, N.J., assignor, by mesne assignments, to E.R. Squibb & Sons, Inc., New York, N.Y., a corporation of Delaware
No Drawing. Filed Mar. 21, 1963, Ser. No. 266,803
10 Claims. (Cl. 260—327)

This invention relates to new chemical compounds having valuable therapeutic properties and processes and intermediates for the preparation thereof.

The therapeutically active compounds of this invention are bases of the general Formula I:

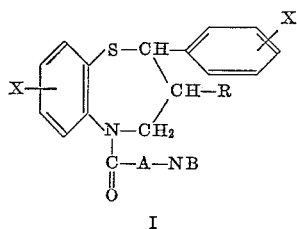

I and the acid-addition salts thereof, wherein each X is hydrogen, lower alkyl, lower alkoxy, nitro, halo or trifluoromethyl; R is hydrogen or lower alkyl; A is lower alkylene (preferably methylene and ethylene); and NB is a basic nitrogen-containing radical of less than twelve carbon atoms. Among the suitable radicals represented by the symbol NB are: amino; (lower alkyl)amino; di(lower alkyl)amino; (hydroxy-lower alkyl)amino; di(hydroxy-lower alkyl)amino; phenyl(lower alkyl)amino; N-(lower alkyl)-N-phenyl(lower alkyl)amino; and saturated 5 to 7 membered monocyclic N-heterocyclic radicals of less than twelve carbon atoms, as exemplified by piperidino; (lower alkyl)piperidino; di(lower alkyl)piperidino; (lower alkoxy)piperidino; homopiperidino; pyrrolidino; (lower alkyl)pyrrolidino; di(lower alkyl)pyrrolidino; (lower alkoxy)pyrrolidino; morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; (lower alkyl)piperazino, (e.g., $N^4$-methylpiperazino); di(lower alkyl)piperazino; (lower alkoxy)piperazino); $N^4$-(hydroxy-lower alkyl)piperazino; $N^4$-(lower alkanoyloxy-lower alkyl)piperazino; and homopiperazino. The terms "lower alkyl," "lower alkoxy," and "lower alkylene" as employed herein, include both straight and branched chain radicals of less than eight carbon atoms. The particularly preferred compounds are those wherein each X is hydrogen or chloro; R is hydrogen; A is methylene or ethylene; and NB is di(lower alkyl)amino, piperidino or $N^4$-methylpiperazino.

As to the salts, those coming within the purview of this invention include the acid-addition salts, particularly the non-toxic acid-addition salts. Acids useful for preparing these acid-addition salts include, inter alia, inorganic acids, such as the hydrohalic acids (e.g., hydrochloric and hydrobromic acid), sulfuric acid, nitric acid, boric acid and phosphoric acid, and organic acids, such as oxalic, tartaric, citric, acetic, succinic, pamoic and maleic acid.

The compounds of this invention and the acid-addition salts thereof are therapeutically active compounds which possess central nervous system stimulant activity and hence are utilizable in the treatment of depression and also for control of obesity. Thus, the compounds of this invention can be administered perorally, the dosage for such treatment being adjusted for the activity of the particular compound employed.

The compounds of this invention can be prepared by the process of this invention, the first step of which comprises reducing a compound of the general Formula II:

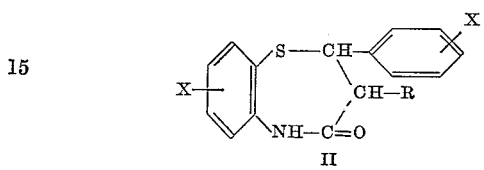

II wherein X and R are as hereinbefore defined. Compounds II can be prepared as disclosed in U.S. Patent No. 3,075,967, granted Jan. 29, 1963. The reduction is accomplished by treating Compounds II with a reducing agent, such as lithium aluminum hydride, whereby new intermediates of this invention of the general Formula III are formed:

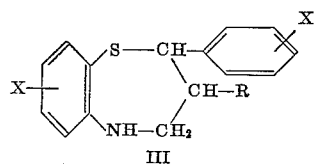

III wherein X and R are as hereinbefore defined.

Suitable starting compounds of the Formula II include:

2,3-dihydro-2-phenyl-1,5-benzothiazepin-4-one;
2,3-dihydro-2-(lower alkyl-phenyl)-1,5-benzothiazepin-4-ones, such as 2,3-dihydro-2-p-tolyl-1,5-benzothiazepin-4-one and 2,3-dihydro-2-o-ethylphenyl-1,5-benzothiazepin-4-one;
2,3-dihydro-2-(halophenyl)-1,5-benzothiazepin-4-ones, such as 2,3-dihydro-2-p-chloro-phenyl-1,5-benzothiazepin-4-one and 2,3-dihydro-2-o-bromophenyl-1,5-benzothiazepin-4-one;
2,3-dihydro-2-(lower alkoxy-phenyl)-1,5-benzothiazepin-4-ones, such as 2,3-dihydro-2-(p-methoxyphenyl)-1,5-benzothiazepin-4-one, 2,3-dihydro-2-(3,4-dimethoxyphenyl)-1,5-benzothiazepin-4-one and 2,3-dihydro-2-(o-methoxyphenyl)-1,5-benzothiazepin-4-one;
2,3-dihydro-2-(nitrophenyl)-1,5-benzothiazepin-4-ones;
2,3-dihydro-2-(trifluoromethylphenyl)-1,5-benzothiazepin-4-ones;
2,3-dihydro-2-phenyl-3-(lower alkyl)-1,5-benzothiazepin-4-ones, such as 2,3-dihydro-2-phenyl-3-methyl-1,5-benzothiazepin-4-one;
2,3-dihydro-2-(lower alkyl-phenyl)-3-(lower alkyl)1,5-benzothiazepin-4-ones;
2,3-dihydro-2-(halophenyl)-3-(lower alkyl)-1,5-benzothiazepin-4-ones;
2,3-dihydro-2-(lower alkoxy-phenyl)-3-(lower alkyl)-1,5-benzothiazepin-4-ones;

2,3-dihydro-2-(nitrophenyl)-3-(lower alkyl)-1,5-benzo-
thiazepin-4-ones; and 2,3-dihydro-2-(trifluoromethylphenyl)-3-(lower alkyl)-
1,5-benzothiazepin-4-ones.

Compounds III are then condensed with a chloro (lower alkanoyl) chloride of the formula: Cl—A—COCl, wherein A is as hereinbefore defined, to yield new intermediates of this invention of the general Formula IV:

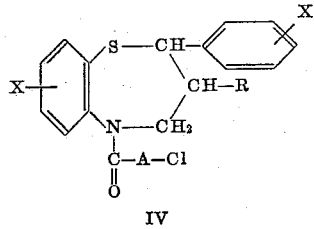

IV wherein X, R and A are as hereinbefore defined. The reaction is preferably conducted in an organic solvent for the reactants in the presence of a tertiary organic base, such as triethylamine, at an elevated temperature, such as the reflux temperature of the mixture.

Compounds IV are then reacted with a base of the formula: HNB, wherein NB is as hereinbefore defined to yield the final products of this invention.

The following examples illustrate the invention (all temperatures being in centigrade):

EXAMPLE 1

*5-diethylaminoacetyl-2,3,4,5-tetrahydro-2-phenyl-
1,5-benzothiazepine, hydrochloride*

(A) PREPARATION OF 2,3,4,5-TETRAHYDRO-2-PHENYL-
1,5-BENZOTHIAZEPINE

A slurry of 22 g. of lithium aluminum hydride in 2.5 l. of anhydrous ether is treated portionwise with 138 g. of finely-divided 2,3-dihydro-2-phenyl-1,5-benzothiazepin-4-one. After stirring for 40 hours at room temperature, the mixture is cooled and treated with 32 ml. of ethyl acetate, followed by dropwise addition of 64 ml. of water and then a solution of 16 g. of sodium hydroxide in 200 ml. of water. The organic phase is filtered from the inorganic salt and the filtrate dried over magnesium sulfate. After evaporation of the solvent, the residue is fractionated to give about 114 g. of liquid, B.P. about 180–183° (0.3 mm.).

(B) PREPARATION OF 5-CHLOROACETYL-2,3,4,5-TETRAHYDRO-2-PHENYL-1,5-BENZOTHIAZEPINE

A solution of 56.5 g. of material from part (A), 26 g. of triethylamine and 950 ml. of benzene is cooled, stirred and treated with a solution of 29.0 g. of chloroacetyl chloride in 150 ml. of benzene. The mixture is stirred at room temperature for three hours, refluxed for 30 minutes, cooled and treated with 200 ml. of cold water. The layers are separated and the organic phase is washed with 300 ml. of dilute hydrochloric acid and then with 450 ml. of water. The organic layer is then dried over magnesium sulfate, filtered and the filtrate concentrated under reduced pressure to give about 55.6 g. of product. Crystallizations from benzenehexane gives a colorless product; M.P. about 154–156°.

(C) PREPARATION OF 5-DIETHYLAMINOACETYL-2,3,4,5-TETRAHYDRO-2-PHENYL-1,5-BENZOTHIAZEPINE

A warm solution of 27.0 g. of material from part (B) in 225 ml. of toluene is treated with 0.5 g. of potassium iodide and then with 19.4 g. of diethylamine. This mixture is refluxed for five hours, cooled and treated with 200 ml. of water. The organic phase is extracted with a solution of 35 ml. of conc. hydrochloric acid in 300 ml. of water. The aqueous phase is made alkaline with 40% potassium hydroxide solution and the liberated base is extracted with 100 ml. portions of ether (six times). The ether phases are combined, filtered and evaporated to give about 29.1 g. of product; M.P. about 103–105°. After crystallization from hexane, the material (about 20.8 g.) melts at about 105–106°.

(D) PREPARATION OF 5-DIETHYLAMINOACETYL-2,3,4,5-TETRAHYDRO - 2 - PHENYL-1,5-BENZOTHIAZEPINE, HYDROCHLORIDE

A solution of 20.3 g. of material from part (C) in 50 ml. of ethanol is treated with 10.5 of 6 N alcoholic hydrogen chloride. This solution is diluted to 750 ml. with ether to give about 22.7 g. of product; M.P. about 210–213°. Recrystallization from isopropyl alcohol gives about 21.6 g. of material, M.P. about 212–213°.

EXAMPLE 2

*5-(3-diethylaminopropionyl)-2,3,4,5-tetrahydro-2-
phenyl-1,5-benzothiazepine, hydrochloride*

This material is prepared in the same manner as Example 1 except that an equivalent quantity of 3-chloropropionyl chloride is substituted for the chloroacetyl chloride in part (B).

EXAMPLE 3

*5-dimethylaminoacetyl-2,3,4,5-tetrahydro-2-phenyl-
1,5-benzothiazepine, hydrochloride*

Following the procedure of Example 1 but substituting an equivalent amount of dimethylamine for the diethylamine in part (C), 5-dimethylaminoacetyl-2,3,4,5-tetrahydro-2-phenyl-1,5-benzothiazepine, hydrochloride is obtained.

EXAMPLE 4

*5-pyrrolidinoacetyl-2,3,4,5-tetrahydro-2-phenyl-
1,5-benzothiazepine, hydrochloride*

Following the procedure of Example 1 but substituting an equivalent amount of pyrrolidine for the diethylamine in part (C), 5-pyrrolidinoacetyl-2,3,4,5-tetrahydro-2-phenyl-1,5-benzothiazepine, hydrochloride is obtained.

EXAMPLE 5

*5-(N-methyl-N-phenethylaminoacetyl)-2,3,4,5-tetrahydro-2-phenyl-1,5-benzothiazepine, hydrochloride*

Following the procedure of Example 1 but substituting an equivalent amount of N-methyl-N-phenethylamine for the diethylamine in part (C), 5-(N-methyl-N-phenethylaminoacetyl) - 2,3,4,5 - tetrahydro-2-phenyl-1,5-benzothiazepine, hydrochloride is obtained.

EXAMPLE 6

*5-morpholinoacetyl-2,3,4,5-tetrahydro-2-phenyl-
1,5-benzothiazepine, hydrochloride*

Following the procedure of Example 1 but substituting an equivalent amount of morpholine for the diethylamine in part (C), 5-morpholinoacetyl-2,3,4,5-tetrahydro-2-phenyl-1,5-benzothiazepine, hydrochloride is obtained.

EXAMPLE 7

*5-piperidinoacetyl-2,3,4,5-tetrahydro-2-phenyl-
1,5-benzothiazepine, hydrochloride*

Following the procedure of Example 1 but substituting an equivalent amount of piperidine for the diethylamine in part (C), 5-piperidinoacetyl-2,3,4,5-tetrahydro-2-phenyl-1,5-benzothiazepine, hydrochloride is obtained.

EXAMPLE 8

*5-($N^4$-methylpiperazinoacetyl)-2,3,4,5-tetrahydro-2-
phenyl-1,5-benzothiazepine, hydrochloride*

Following the procedure of Example 1 but substituting an equivalent amount of $N^4$-methylpiperazine for the diethylamine in part (C), 5-(N⁴-methylpiperazinoacetyl)-2,3,4,5 - tetrahydro-2-phenyl-1,5-benzothiazepine, hydrochloride is obtained.

EXAMPLE 9

*5-diethylaminoacetyl-2,3,4,5-tetrahydro-2-(3,4-dimethoxyphenyl)-1,5-benzothiazepine, hydrochloride*

Following the procedure of Example 1 but substituting an equivalent amount of 2,3-dihydro-2-(3,4-dimethoxyphenyl)-1,5-benzothiazepin-4-one for the benzothiazepinone in part (A), 5-diethylaminoacetyl-2,3,4,5-tetrahydro-2-(3,4-dimethoxyphenyl)-1,5-benzothiazepine, hydrochloride is obtained.

EXAMPLE 10

*5-diethylaminoacetyl-2,3,4,5-tetrahydro-2-(p-methoxyphenyl)-1,5-benzothiazepine, hydrochloride*

Following the procedure of Example 1 but substituting an equivalent amount of 2,3-dihydro-2-(p-methoxyphenyl) - 1,5 - benzothiazepin-4-one for the benzothiazepinone in part (A), 5-dimethylaminoacetyl-2,3,4,5-tetrahydro - 2-(p-methoxyphenyl)-1,5-benzothiazepine, hydrochloride is obtained.

EXAMPLE 11

*5 - diethylaminoacetyl-2,3,4,5 - tetrahydro-2-(o-methoxyphenyl)-1,5-benzothiazepine, hydrochloride*

Following the procedure of Example 1, but substituting an equivalent amount of 2,3-dihydro-2-(o-methoxyphenyl)-1,5-benzothiazepin-4-one for the benzothiazepinone in part (A), 5-dimethylaminoacetyl-2,3,4,5-tetrahydro-2-(o-methoxyphenyl)-1,5-benzothiazepine, hydrochloride is obtained.

EXAMPLE 12

*5 - diethylaminoacetyl - 2,3,4,5 - tetrahydro-2-(p-chlorophenyl)-1,5-benzothiazepine, hydrochloride*

Following the procedure of Example 1, but substituting an equivalent amount of 2,3-dihydro-2-(p-chlorophenyl)-1,5-benzothiazepin-4-one for the benzothiazepinone in part (A), 5-dimethylaminoacetyl-2,3,4,5-tetrahydro - 2-(p-chlorophenyl)-1,5-benzothiazepine, hydrochloride is obtained.

EXAMPLE 13

*5 - diethylaminoacetyl - 2,3,4,5-tetrahydro-2-(p-tolyl)-1,5-benzothiazepine, hydrochloride*

Following the procedure of Example 1, but substituting an equivalent amount of 2,3-dihydro-2-p-tolyl-1,5-benzothiazepin-4-one for the benzothiazepinone in part (A), 5 - dimethylaminoacetyl - 2,3,4,5-tetrahydro-2-(p-tolyl)-1,5-benzothiazepine, hydrochloride is obtained.

EXAMPLE 14

*5 - diethylaminoacetyl - 2,3,4,5 - tetrahydro-2-phenyl-3-1,5-benzothiazepine, hydrochloride*

Following the procedure of Example 1, but substituting an equivalent amount of 2,3-dihydro-2-phenyl-3-methyl-1,5-benzothiazepin-4-one, M.P. about 236–238°, for the benzothiazepinone in part (A), 5-diethylaminoacetyl - 2,3,4,5 - tetrahydro-2-phenyl-3-methyl-1,5-benzothiazepine, hydrochloride is obtained.

EXAMPLE 15

*2 - phenyl - 5 - diethylaminoacetyl-7-chloro-2,3,4,5-tetrahydro-1,5-benzothiazepine, hydrochloride*

Following the procedure of Example 1, but substituting an equivalent amount of 2,3-dihydro-2-phenyl-7-chloro-1,5-benzothiazepin-4-one, M.P. about 232–233°, for the benzothiazepinone in part (A), 2-phenyl-5-diethylaminoacetyl - 7 - chloro-2,3,4,5-tetrahydro-1,5-benzothiazepine, hydrochloride is obtained.

EXAMPLE 16

*2 - phenyl-5-diethylaminoacetyl-7-methyl-2,3,4,5-tetrahydro-1,5-benzothiazepine, hydrochloride*

Following the procedure of Example 1, but substituting an equivalent amount of 2,3 - dihydro - 2 - phenyl - 7-methyl-1,5-benzothiazepin-4-one for the benzothiazepinone in part (A), 2-phenyl-5-diethylaminoacetyl-7-methyl - 2,3,4,5-tetrahydro-1,5-benzothiazepine, hydrochloride is obtained.

EXAMPLE 17

*2 - phenyl - 5-diethylaminoacetyl-7-methoxy-2,3,4,5-tetrahydro-1,5-benzothiazepine, hydrochloride*

Following the procedure of Example 1, but substituting an equivalent amount of 2,3 - dihydro - 2 - phenyl - 7-methoxy-1,5-benzothiazepin-4-one for the benzothiazepinone in part (A), 2-phenyl-5-diethylaminoacetyl-7-methoxy - 2,3,4,5-tetrahydro-1,5-benzothiazepine, hydrochloride is obtained.

EXAMPLE 18

*2 - phenyl - 5-diethylaminoacetyl-7-(trifluoromethyl)-2,3,4,5-tetrahydro-1,5-benzothiazepine, hydrochloride*

Following the procedure of Example 1, but substituting an equivalent amount of 2,3-dihydro-2-phenyl-7-(trifluoromethyl)-1,5-benzothiazepin-4-one for the benzothiazepinone in part (A), 2-phenyl-5-diethylaminoacetyl-7 - (trifluoromethyl)-2,3,4,5-tetrahydro-1,5-benzothiazepine, hydrochloride is obtained.

This invention may be variously otherwise embodied within the scope of the appended claims.

What is claimed is:

1. A compound selected from the group consisting of bases of the formula

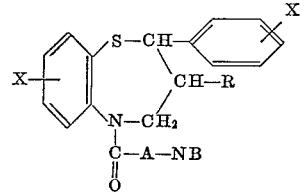

and pharmaceutically-acceptable acid-addition salts thereof, wherein each X is selected from the group consisting of hydrogen, lower alkyl, lower alkoxy, nitro, halo and trifluoromethyl; R is selected from the group consisting of hydrogen and lower alkyl; A is lower alkylene; and NB is a basic nitrogen-containing radical of less than twelve carbon atoms selected from the group consisting of amino, (lower alkyl)amino, di(lower alkyl)amino, (hydroxy-lower alkyl)amino, di(hydroxy-lower alkyl) amino, phenyl(lower alkyl)amino, N-(lower alkyl)-N-phenyl(lower alkyl)amino, piperidino, (lower alkyl)piperidino, di(lower alkyl)piperidino, (lower alkoxy)piperidino, homopiperidino, pyrrolidino, (lower alkyl)pyrrolidino, di(lower alkyl) pyrrolidino, (lower alkoxy)pyrrolidino, morpholino, (lower alkyl)morpholino, di(lower alkyl)morpholino, (lower alkoxy)morpholino, thiamorpholino, (lower alkyl)thiamorpholino, di(lower alkyl) thiamorpholino, (lower alkoxy)thiamorpholino, piperazino, (lower alkyl)piperazino, di(lower alkyl)piperazino, (lower alkoxy)piperazino, N⁴-(hydroxy-lower alkyl)piperazino, N⁴-(lower alkanoyloxy-lower alkyl)piperazino and homopiperazino.

2. 5 - di(lower alkyl)amino(lower alkanoyl)-2,3,4,5-tetrahydro-2-phenyl-1,5-benzothiazepine.

3. A pharmaceutically-acceptable acid-addition salt of the compound of claim 2.

4. 5 - diethylaminoacetyl-2,3,4,5-tetrahydro-2-phenyl-1,5-benzothiazepine.

5. A pharmaceutically-acceptable acid-addition salt of the compound of claim 4.

6. A compound of the formula

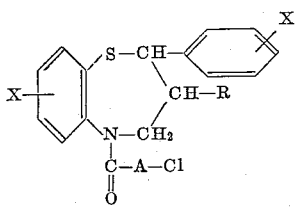

wherein each X is selected from the group consisting of hydrogen, lower alkyl, lower alkoxy, nitro, halo and trifluoromethyl; R is selected from the group consisting of hydrogen and lower alkyl; and A is lower alkylene.

7. 5 - (chloro - lower alkanoyl)-2,3,4,5-tetrahydro-2-phenyl-1,5-benzothiazepine.

8. 5 - chloroacetyl - 2,3,4,5 - tetrahydro-2-phenyl-1,5-benzothiazepine.

9. A compound of the formula:

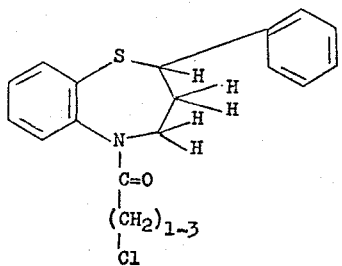

10. A compound of the formula:

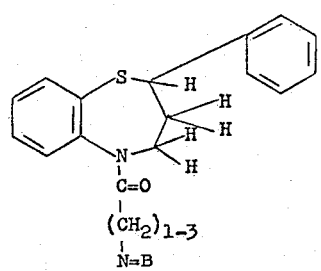

wherein N=B is a member selected from the group consisting of di(lower alkyl)-amino, di(hydroxy lower alkyl) amino, 1-piperidyl, lower alkylated 1-piperidyl, 1-pyrrolidyl, lower alkylated 1-pyrrolidyl, 4-morpholinyl, lower alkylated 4-morpholinyl and 1-piperazinyl.

UNITED STATES PATENTS
References Cited 3,029,251  4/1962  Fancher et al. _____ 260—327

OTHER REFERENCES

Hromatka et al.: Monatsh. für Chemie, vol. 88 (1957). pp. 64–71.

JAMES A. PATTEN, *Primary Examiner.*

N. S. RIZZO, *Examiner.*